United States Patent [19]

Masuko et al.

[11] 4,172,782
[45] Oct. 30, 1979

[54] RECOVERY OF CATALYST

[75] Inventors: Fujio Masuko; Hiroshi Yamachika, both of Ibaraki; Kazuhiko Fujiyoshi, Toyonaka; Katsuyuki Shiota, Takarazuka, all of Japan

[73] Assignee: Sumitomo Chemical Company, Limited, Osaka, Japan

[21] Appl. No.: 907,346

[22] Filed: May 18, 1978

[30] Foreign Application Priority Data

May 23, 1977 [JP] Japan ............................. 52-60267
May 23, 1977 [JP] Japan ............................. 52-60268

[51] Int. Cl.$^2$ ............................................. B01D 11/04
[52] U.S. Cl. .................................. 260/567.6 H; 210/60; 210/61; 210/62; 210/73 R; 210/21; 260/465 R; 260/567.6 M
[58] Field of Search .................. 210/21, 59, 60, 61, 210/62, 73 R, 22; 260/465 R, 465 G, 705, 567.6 R

[56] References Cited

U.S. PATENT DOCUMENTS

| 2,758,991 | 8/1956 | Kretzers et al. | 260/705 |
| 3,413,309 | 11/1968 | Makosza et al. | 260/333 |
| 3,959,169 | 5/1976 | Hunt et al. | 252/182 |
| 4,012,428 | 3/1977 | Ohno et al. | 260/465 G |
| 4,056,509 | 11/1977 | Verbrugge et al. | 260/465 G |

Primary Examiner—Charles N. Hart
Assistant Examiner—David R. Sadowski
Attorney, Agent, or Firm—Stevens, Davis, Miller & Mosher

[57] ABSTRACT

An organic quaternary ammonium salt used as a catalyst in a reaction between a benzylnitrile and a halide in the presence of an alkali to obtain an α-alkyl- or α-phenyl-benzylnitrile, is recovered effectively from the reaction solution containing the α-alkyl- or α-phenyl-benzylnitrile, the alkali and the catalyst, by adding water to the reaction solution to make the alkali concentration of the water layer 10% by weight or below, and then separating the water layer containing the organic quaternary ammonium salt from the oil layer containing the α-alkyl- or α-phenyl-benzylnitrile.

5 Claims, 1 Drawing Figure

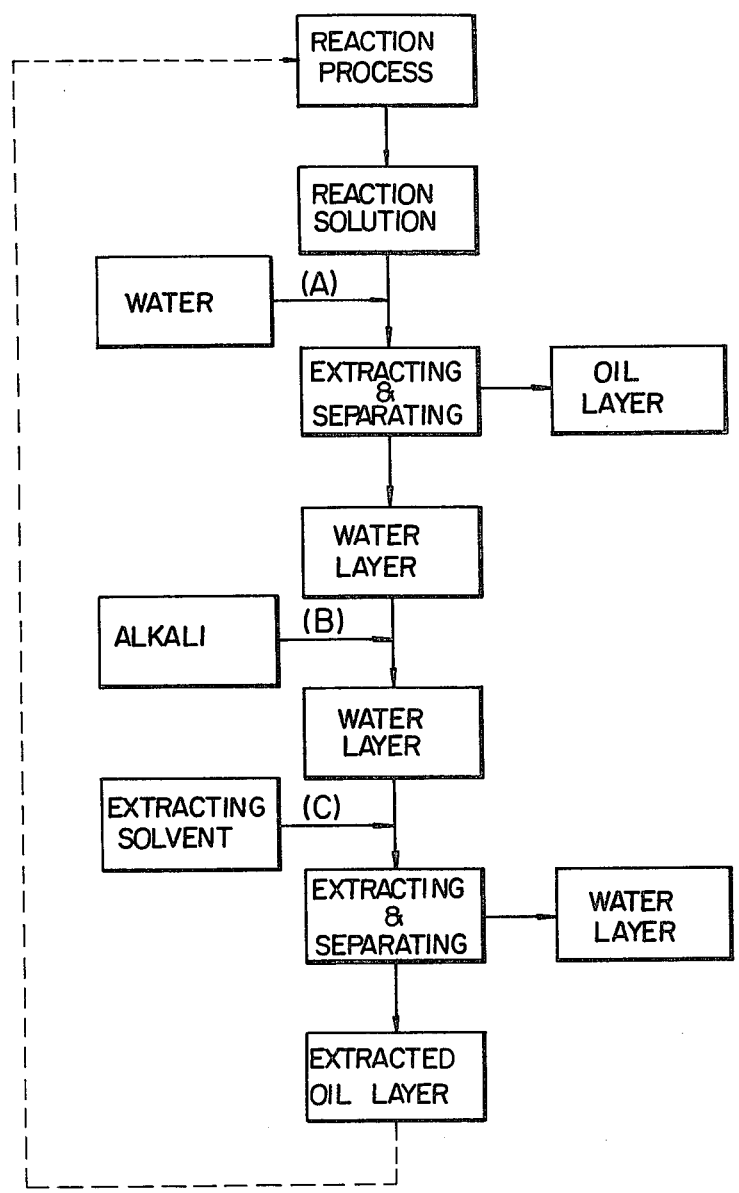

RECOVERY OF CATALYST

This invention relates to a method of recovering a catalyst. More particularly, it relates to a method of recovering an organic quaternary ammonium salt used as catalyst from a reaction solution after completion of the reaction in preparing substituted benzylnitriles by the reaction between benzylnitriles and halides in the presence of an alkali and the organic quaternary ammonium salt as catalyst.

There has been disclosed in Japanese Patent Application Kokai (Laid-Open) No. 63,145/76 a method for preparing a 3-methyl-2-(4-halogenophenyl)butyronitrile by the reaction between a p-halogenophenylacetonitrile and an isopropyl halide using an organic quaternary ammonium salt as catalyst in the presence of a base. However, the behavior and the recovering method of the catalyst after completion of the reaction have not heretofore been described in the literature. Also in other similar reactions, the behavior and the recovering method of such a catalyst have not heretofore been described in any literature.

Because of its expensiveness, the organic quaternary ammonium salt is used inevitably in a minimum amount as catalyst in the reactions on a commercial scale. Other problems associated with the use of organic quaternary ammonium salt as catalyst are the disposal of spent catalyst, because if it is discharged from the reaction system, its high toxicity will cause severe environmental pollution, and moreover purification of the product is required inevitably, if the catalyst remains in the reaction product to decrease the purity of the product.

Under the circumstances, the present inventors made extensive studies on the behavior of the catalyst after completion of the reaction and, as the result, found that the partition coefficient of the organic quaternary ammonium salt between an oil layer and a water layer varies to a great extent according to the concentration of an alkali in the water layer. This finding has led to the present invention.

According to this invention, there is provided a method for recovering an organic quaternary ammonium salt used as a catalyst in a reaction between a benzylnitrile and a halide in the presence of an alkali to produce a reaction solution comprising an α-alkyl- or phenyl-benzylnitrile, the alkali and the organic quaternary ammonium salt as the catalyst, which comprises subjecting the reaction solution to extraction with water to obtain a water layer comprising the organic quaternary ammonium salt and an oil layer comprising the α-alkyl- or α-phenyl-benzylnitrile, and separating the water layer from the oil layer.

For the commercial production of substituted benzylnitriles, the method of this invention will afford elimination of the drawbacks of the prior art such as restriction of the amount to be used of the catalyst, environmental pollution due to increased load of waste water, insufficient purity of the intended product, high production cost and the like, and also afford possibility of the increase in the amount of the catalyst to increase the rate of reaction, and the operational easiness of the production.

The method of this invention is described below more fully with reference to the attached flow chart (FIG.).

In the present invention, the reaction solution as herein referred to is a mixture obtained by the reaction between a benzylnitrile and a halide using an organic quaternary ammonium salt in the presence of an alkali, the mixture comprising the reaction product, an α-alkyl- or α-phenyl-benzylnitrile, the organic quaternary ammonium salt and the alkali.

The water added to the reaction solution is an extracting solvent for the alkali and the organic quaternary ammonium salt in the reaction solution and its amount can be determined from the water-alkali-organic quaternary ammonium salt-oil layer equilibrium.

The oil layer, as herein referred to, includes reaction products of a benzylnitrile and a halide and unreacted starting materials, the main components being a desired α-alkyl- or α-phenylbenzylnitrile and an unreacted halide.

Properties of the organic quaternary ammonium salt are as given below.

The organic quaternary ammonium salt is soluble both in water and in the oil layer. Its solubility in an aqueous alkali solution varies with the concentration of the alkali. The solubilities of tetra-n-butylammonium bromide, as an example of organic quaternary ammonium salts, in aqueous sodium hydroxide solutions were measured at 20° C. and the results obtained were as shown in Table 1.

Table 1

| Concentration of NaOH (% by wt.) | Solubility of tetra-n-butyl-ammonium bromide (% by wt.) |
| --- | --- |
| 15 | 0.07 |
| 10 | 1.2 |
| 5 | 2.4 |
| 2 | 11 |
| 1 | 27 |

From the solubility of tetra-n-butylammonium bromide in aqueous sodium hydroxide solutions as shown in Table 1 above, it is favorable for the extraction of tetra-n-butylammonium bromide from the reaction solution with water to reduce the concentration of alkali of the water layer as far as possible. For this reason, the extraction and separation of an organic quaternary ammonium salt from the reaction solution are preferably carried out in plural steps. That is, a desirable extraction efficiency can be attained by at first adding a relatively small amount of water to the reaction mixture to make the alkali concentration of the water layer relatively high (for example, 15% by weight or higher) by obtaining the water layer comprising all or a part of the amount used of the alkali, by separating the water layer from the oil layer comprising the reaction product and the organic quaternary ammonium salt, and then by adding water to the oil layer to obtain a water layer comprising the organic quaternary ammonium salt and an oil layer comprising the reaction product.

Since the distribution of the organic quaternary ammonium salt between the oil layer and the water layer is in favor of the latter, the amount of water used is determined optionally so long as due consideration is paid to the alkali content as shown in Table 1. From the above Table, in case of a single extraction and separation, it is clear that water is added to the reaction mixture favorably in such an amount to make the alkali concentration of the water layer 10% by weight or below, more favorably 5% by weight or below. However, the larger the amount of water used is, the more favorable is the extraction. The extraction temperature and the phase separation temperature are not critical but are generally in the range of −20° to 150° C., preferably 0° to 80° C.

The organic quaternary ammonium salt thus extracted has commercially sufficiently high purity and the extract can be used as such in commercial production of the α-substituted benzylnitriles as catalyst. On distillation of the water layer, the quaternary ammonium salt can be recovered in crystalline or oily form. Alternatively, after adjusting the alkali content [step (B) in FIG.], the quaternary ammonium salt can be extracted with an organic solvent [step (C) in FIG.].

As described above, the solubility in water of the organic quaternary ammonium salt varies markedly with the concentration of the alkali. Therefore, for the extraction with an organic solvent, a desirable alkali content of the water layer is 5% by weight or higher, preferably 10% by weight or higher.

If the alkali content of the water layer has already been made 5% by weight or higher by adjusting the amount of water used in extracting the reaction solution, the readjustment is of course unnecessary and the water layer can be directly subjected to the next step of extraction with an organic solvent. By such an adjustment, the quaternary ammonium salt can easily be extracted with an organic solvent from the water layer.

The alkalies used for adjusting the alkali content are sodium hydroxide, potassium hydroxide, lithium hydroxide, sodium carbonate, potassium carbonate, sodium hydrogencarbonate, calcium hydroxide, and the like, each is used alone or in mixtures. The alkali for the adjustment of the alkali content is not necessarily the same as that used in the reaction. The adjustment is carried out at any temperature, but generally at a temperature in the range of −20° to 150° C., preferably 0° to 80° C.

The step (C) of extraction with an organic solvent is carried out in the following way.

In the step (C), the organic quaternary ammonium salt is extracted with an organic solvent from the water layer obtained in the step (B). The organic solvents used are halohydrocarbons such as chloroform, carbon tetrachloride and dichloromethane; carboxylic acid esters such as methyl acetate, ethyl acetate, methyl propionate and ethyl propionate; ketones such as methyl ethyl ketone, methyl isobutyl ketone and diethyl ketone; nitriles such as propionitrile, butyronitrile and isobutyronitrile; and alcohols such as n-butanol. These solvents are used each alone or in combinations. Of the above solvents, those difficultly soluble in water are preferred for the extracting and separating operations. It is also possible to use a mixture of an organic solvent difficultly dissolving in the organic quaternary ammonium salt and an organic solvent dissolving in the salt for the purpose of improving the easiness of handling by suitably regulating the crystallization temperature, specific gravity, viscosity, flash point, solubility in water and the like.

The organic quaternary ammonium salt thus extracted has a sufficient purity for technical use and the organic layer containing the organic quaternary ammonium salt and the organic solvent can be used as such in the reaction as a starting catalyst, and, of course, on distillation of the organic solvent, the quaternary ammonium salt can be obtained in crystalline or oily form.

Further, interesting extractive solvents are the benzylnitriles only or mixtures of benzylnitriles and halides used as starting materials for the production of α-substituted benzylnitriles. These can be used to extract the organic quaternary ammonium salts from the water layer. Without isolating the organic quaternary ammonium salt, the extract solution can much advantageously be used as catalyst as well as starting materials.

The extraction in the step (C) may be carried out at any temperature, but usually at a temperature in the range of −20° to 150° C., preferably 0° to 80° C.

As described in the foregoing, only liquids are handled in the present method for recovering an organic quaternary ammonium salt from the reaction solution obtained by the reaction between a benzylnitrile and a halide in the presence of said salt as catalyst. Accordingly, the recovery can be carried out either batchwise or continuously. This is an important advantage of this invention when practiced on a commercial scale.

Examples of organic quaternary ammonium salts include tetra-n-butylammonium chloride, or bromide or hydroxide, tetra-n-propylammonium chloride or bromide or hydroxide, triethylamine hydrochloride or hydrobromide, tetraethylammonium chloride or bromide or hydroxide, tetramethylammonium chloride or bromide or hydroxide, lauryltrimethylammonium chloride or bromide or hydroxide, stearyltrimethylammonium chloride or bromide or hydroxide, trimethyloctadecylammonium chloride or bromide or hydroxide, trimethylhexadecylammonium chloride or bromide or hydroxide, distearyldimethylammonium chloride or bromide or hydroxide, tricaprylmethylammonium chloride or bromide or hydroxide, o-, m- or p-methoxybenzyltriethylammonium chloride or bromide or hydroxide, o-, m- or p-phenoxybenzyltriethylammonium chloride or bromide or hydroxide, lauryl-picolinium chloride or bromide or hydroxide, stearylamidomethylpyridinium chloride or bromide or hydroxide, triethylpropylammonium chloride or bromide or hydroxide, diethylpropylbenzylammonium chloride or bromide or hydroxide, trimethylbenzylammonium chloride or bromide or hydroxide, triethylbenzylammonium chloride or bromide or hydroxide, o-, m- or p-chlorobenzyltriethylammonium chloride or bromide or hydroxide, methylethylpropylbenzylammonium chloride or bromide or hydroxide, diethylbutylbenzylammonium chloride or bromide or hydroxide, methyldiethylbenzylammonium chloride or bromide or hydroxide, dimethylethylbenzylammonium chloride or bromide or hydroxide, tripropylbenzylammonium chloride or bromide or hydroxide, ethyldipropylbenzylammonium chloride or bromide or hydroxide, diethyldibenzylammonium chloride or bromide or hydroxide, dimethyllaurylbenzylammonium chloride or bromide or hydroxide, stearylbenzyldimethylammonium chloride or bromide or hydroxide, octylbenzyldimethylammonium chloride or bromide or hydroxide, and myristylbenzyldimethylammonium chloride or bromide or hydroxide. These salts are used each alone or in combinations.

The alkalis used in the method of this invention are, for example, sodium hydroxide, potassium hydroxide, lithium hydroxide, calcium hydroxide, sodium carbonate, potassium carbonate and sodium hydrogen-carbonate. These alkalis are used each alone or in combinations.

The benzylnitriles, as herein referred to, are, for example, benzylnitrile, o-, m- or p-chlorobenzylnitrile, o-, m- or p-bromobenzylnitrile, o-, m- or p-fluorobenzylnitrile, o-, m- or p-methoxybenzylnitrile, o-, m- or p-ethoxybenzylnitrile, o-, m- or p-phenoxybenzylnitrile, o-, m- or p-methylbenzylnitrile, o-, m- or p-ethylbenzylnitrile, o-, m- or p-propylbenzylnitrile, o-, m- or p-isopropylbenzylnitrile, o-, m- or p-butylbenzylnitrile, o-, m- or p-isobutylbenzylnitrile, o-, m- or p-trichloromethylbenzylnitrile, 3,4-dimethoxybenzylnitrile, 3,4-dimethylbenzylnitrile, 3,4-methyleneoxybenzylnitrile, 3,4-dibromobenzylnitrile, 3,4-dichlorobenzylnitrile, 2,4-dichlorobenzylnitrile, and 2,4-dibromobenzylnitrile.

Examples of the halides, as herein referred to, include methyl chloride or bromide or iodide, ethyl chloride or bromide or iodide, propyl chloride or bromide or iodide, isopropyl chloride or bromide or iodide, butyl chloride or bromide or iodide, isobutyl chloride or bromide or iodide, chloro- or bromo- or iodo-benzene, o-, m- or p-chloronitrobenzene, o-, m- or p-bromonitrobenzene, and o-, m- and p-iodonitrobenzene.

Examples of substituted benzylnitriles, as herein referred to, include α-methylbenzylnitrile, α-ethylbenzylnitrile, α-propylbenzylnitrile, α-isopropylbenzylnitrile, α-butylbenzylnitrile, α-isobutylbenzylnitrile, o-, m- or p-chloro-α-methylbenzylnitrile, o-, m- or p-bromo-α-methylbenzylnitrile, o-, m- or p-chloro-α-ethylbenzylnitrile, o-, m- or p-chloro-α-propylbenzylnitrile, o-, m- or p-chloro-α-isopropylbenzylnitrile, o-, m- or p-chloro-α-butylbenzylnitrile, o-, m- or p-chloro-α-isobutylbenzylnitrile, o-, m- or p-bromo-α-ethylbenzylnitrile, o-, m- or p-bromo-α-propylbenzylnitrile, o-, m- or p-bromo-α-isopropylbenzylnitrile, o-, m- or p-bromo-α-butylbenzylnitrile, o-, m- or p-bromo-α-isobutylbenzylnitrile, o-, m- or p-fluoro-α-isopropylbenzylnitrile, o-, m- or p-methoxy-α-isopropylbenzylnitrile, o-, m- or p-ethoxy-α-isopropylbenzylnitrile, o-, m- or p-phenoxy-α-isopropylbenzylnitrile, o-, m- or p-methyl-α-isopropylbenzylnitrile, o-, m- or p-ethyl-α-isopropylbenzylnitrile, o-, m- or p-propyl-α-isopropylbenzylnitrile, o-, m- or p-isopropyl-α-isopropylbenzylnitrile, o-, m- or p-butyl-α-isopropylbenzylnitrile, o-, m- or p-isobutyl-α-isopropylbenzylnitrile, o-, m- or p-trifluoromethyl-α-isopropylbenzylnitrile, 3,4-dimethoxy-α-isopropylbenzylnitrile, 3,4-dimethyl-α-isopropylbenzylnitrile, 3,4-methyleneoxy-α-isopropylbenzylnitrile, 3,4-dibromo-α-isopropylbenzylnitrile, 3,4-dichloro-α-isopropylbenzylnitrile, 2,4-dichloro-α-isopropylbenzylnitrile, 2,4-dibromo-α-isopropylbenzylnitrile, o-, m- or p-isobutyl-α-phenylbenzylnitrile, o-, m- or p-ethoxy-α-phenylbenzylnitrile, o-, m- or p-methoxy-α-phenylbenzylnitrile, o-, m- or p-chloro-α-phenylbenzylnitrile, o-, m- or p-isobutyl-α-(4'-nitro)phenylbenzylnitrile, and o-, m- or p-chloro-α-(4'-nitro)phenylbenzylnitrile.

The invention is illustrated below in detail with reference to Examples, but the scope of the invention should not, of course, be limited thereto.

EXAMPLE 1

Into a reactor, were charged 177.7 g of a 45% (weight) aqueous sodium hydroxide solution and 12.5 g of tetra-n-butylammonium bromide. To the resulting mixture heated at 40° to 42° C., were added dropwise a mixture of 75.6 g of p-chlorobenzylnitrile and 156.5 g of isopropyl chloride over a period of 3 hours. After the dropwise addition, the reaction mixture was kept at 42° C. under reflux for 3 hours. After being cooled to a temperature of 30° C. or lower, the reaction mixture was admixed with 1,100 g of water, stirred for 30 minutes and left standing for 20 minutes to allow the mixture to separate into an oil layer and a water layer. On concentration of the oil layer, there were obtained 97 g of p-chloro-α-isopropylbenzylnitrile in oily form.

To the water layer, was added 1,000 g of chloroform. After being stirred for 30 minutes, the mixture was left standing for 20 minutes to allow the mixture to separate into a water layer and a chloroform layer. To the water layer, was again added 1,000 g of chloroform. After being stirred for 30 minutes, the mixture was left standing for 20 minutes to allow the mixture to separate into a water layer and a chloroform layer.

The first and second chloroform layers were combined and concentrated at atmospheric pressure to recover 9.4 g of the organic quaternary ammonium salt comprising tetra-n-butyl ammonium bromide. The recovery was 75%. The amount of residual ammonium salt comprising tetra-n-butylammonium bromide in the water layer was 0.09 g.

EXAMPLE 2

After completion of the reaction carried out in the same manner as in Example 1, the reaction mixture was admixed with 115.7 g of water, stirred for 20 minutes at 20° C. and left standing for 20 minutes to allow the mixture to separate into an oil layer and a water layer. The water layer contained 20.07% of sodium hydroxide and no organic quaternary ammonium salt used as catalyst.

To the oil layer, was again added 62.4 g of water. The mixture was stirred for 20 minutes at 20° C. and left standing for 20 minutes to allow the mixture to separate into an oil layer and a water layer. The water layer contained 0.64% of sodium hydroxide and 8.4 g of the ammonium salt comprising tetra-n-butylammonium bromide, the extraction rate of the latter being 67.2% of the amount initially charged.

The oil layer was again admixed with 62.4 g of water, stirred for 20 minutes at 20° C. and left standing for 20 minutes to allow the mixture to separate into an oil layer and a water layer. The water layer contained 2.8 g of the ammonium salt comprising tetra-n-butylammonium bromide, corresponding to a extraction rate of 22.7% based on the amount initially charged.

The oil layer was further admixed with 62.4 g of water, stirred for 20 minutes at 20° C., and left standing for 20 minutes to allow the mixture to separate into an oil layer and a water layer. The water layer contained 0.8 g of the ammonium salt comprising tetra-n-butylammonium bromide which corresponded to an extraction rate of 6.2% based on the amount initially charged. On concentration of the oil layer, 95.6 g of p-chloro-α-isopropylbenzylnitrile were obtained.

The water layers containing the ammonium salt comprising tetra-n-butylammonium bromide were combined together with the water layer separated at first from the reaction mixture and the sodium hydroxide content was adjusted to 12%. To the aqueous mixture, was added 230 g of ethyl acetate. The resulting mixture was stirred for 20 minutes at 20° C. and left standing for 20 minutes to allow the mixture to separate into an ethyl acetate layer and a water layer. The water layer contained no residual organic quaternary ammonium salt. The ethyl acetate layer was concentrated to recover 12.0 g of the ammonium salt comprising tetra-n-butylammonium bromide, which corresponded to 96.0% recovery.

EXAMPLE 3

Using tricaprylmethylammonium chloride as catalyst, the reaction was carried out in a manner similar to that in Example 1. The extraction of the catalyst and succeeding separation were carried out similarly to those in Example 2. The water layers containing the ammonium salt comprising tricaprylmethylammonium chloride were combined and the water was removed by distillation to obtain the ammonium salt comprising tricaprylmethylammonium chloride with 85% recovery.

EXAMPLE 4

Using tetra-n-propylammonium bromide as catalyst, the reaction and the extraction with water were carried out in a manner similar to that in Example 3. Sodium hydroxide was added to the water layer containing the catalyst to adjust the alkali content to be 55%. The resulting water layer was used again in the reaction carried out similarly to Example 1. No decrease in the rate of reaction was observed.

EXAMPLE 5

The reaction was carried out in a manner similar to that in Example 1 and the extraction of tetra-n-butylammonium bromide used as catalyst with water was carried out similarly to Example 2. The subsequent extraction with an organic solvent was carried out with a mixture of 75.6 g of p-chlorobenzylnitrile and 156.5 g of isopropyl chloride in place of ethyl acetate. No residual organic quaternary ammonium salt was found in the aqueous layer.

The above mixture of p-chlorobenzylnitrile and isopropyl chloride containing the recovered catalyst was added dropwise over a period of 3 hours to 177.7 g of a 45% (weight) aqueous sodium hydroxide solution maintained at 40° to 42° C. After the dropwise addition, the reaction mixture was kept at 42° C. under reflux for 3 hours. Thereafter, the reaction mixture was cooled below 30° C. and treated similarly to Example 2. The extraction of the catalyst from the water layer with an organic solvent was carried out again by using a fresh mixture of 75.6 g of p-chlorobenzylnitrile and 156.5 g of isopropyl chloride.

The above reaction and extraction of the catalyst were repeated 10 times. The yield of p-chloro-α-isopropylbenzylnitrile was each time in the range of 90 to 95%. Neither a decrease in the rate of reaction nor decomposition of the catalyst was observed.

EXAMPLE 6

In a manner similar to that in Example 5, the reaction and the re-use of the catalyst were repeated 10 times using tricaprylmethylammonium chloride as catalyst. Each time, the yield of p-chloro-α-isopropylbenzylnitrile was in the range of 92 to 96%. Neither a decrease in the rate of reaction nor decomposition of the catalyst was observed.

EXAMPLE 7

Into a mixture of 3,000 g of a 50% (weight) aqueous sodium hydroxide solution and 23.0 g of benzyltriethylammonium chloride, while being maintained at 40° to 45° C., was added dropwise over a period of 3 hours a mixture of 750 g of p-isobutylbenzylnitrile and 680 g of isopropyl bromide. After the dropwise addition, the reaction mixture was further heated at 50° to 55° C. for 6 hours to complete the reaction. After having been cooled below 50° C., the reaction mixture was admixed with 6,500 g of water, stirred for 30 minutes, and left standing for 30 minutes to allow the mixture to separate into an oil layer and a water layer. The water layer contained 20.0% of sodium hydroxide and no organic quaternary ammonium salt used as catalyst.

The oil layer was again admixed with 150 g of water, stirred for 30 minutes at 15° C., and left standing for 30 minutes to allow the mixture to separate into an oil layer and a water layer. The water layer contained 14.5 g of the ammonium salt comprising benzyltriethylammonium chloride, corresponding to an extraction rate of 63.0% based on the initially charged benzyltriethylammonium chloride.

The oil layer was again admixed with 150 g of water, stirred for 30 minutes at 15° C., and left standing for 30 minutes to allow the mixture to separate into an oil layer and a water layer. The water layer contained 4.6 g of the ammonium salt comprising benzyltriethylammonium chloride, corresponding to an extraction rate of 20.0% based on the initially charged amount.

The oil layer was again admixed with 150 g of water, stirred for 30 minutes, and left standing for 30 minutes to allow the mixture to separate into an oil layer and a water layer. The water layer contained 1.84 g of the ammonium salt comprising benzyltriethylammonium chloride, corresponding to an extraction rate of 8.0% based on initially charged amount.

The oil layer was again admixed with 150 g of water, stirred for 30 minutes, and left standing for 30 minutes to allow the mixture to separate into an oil layer and a water layer. The water layer contained 1.04 g of the ammonium salt comprising benzyltriethylammonium chloride, corresponding to an extraction rate of 4.5% based on initially charged amount. On concentration of the oil layer, 910 g of p-isobutyl-α-isopropylbenzylnitrile were obtained.

The above water layers containing the ammonium salt comprising benzyltriethylammonium chloride were combined, admixed with 120 g of sodium hydroxide to adjust the alkali content to 16%, then admixed with 1,000 g of chloroform, stirred for 30 minutes at 20° C., and left standing for 30 minutes to allow the mixture to separate into a chloroform layer and a water layer.

The residual ammonium salt comprising benzyltriethylammonium chloride in the water layer was 0.5 g. On concentration of the chloroform layer, there were recovered 21.48 g of the ammonium salt comprising benzyltriethylammonium chloride, corresponding to a recovery of 93.4%.

What is claimed is:

1. A method for recovering an organic quaternary ammonium salt from a reaction solution produced by the reaction between a benzylnitrile and a halide in the presence of an alkali and the organic quaternary ammonium salt as a catalyst, the reaction solution comprising an α-alkyl- or α-phenyl-benzylnitrile, the alkali and the organic quaternary ammonium salt, which comprises the steps of
   (1) adding water to the reaction solution to obtain a water layer containing all or a part of the alkali and an oil layer containing the quaternary ammonium salt and the α-alkyl- or α-phenyl-benzylnitrile, the water being added in such a small amount that substantially no organic quaternary ammonium salt transfers into the water layer,
   (2) separating the oil layer from the water layer,
   (3) adding water to the oil layer to make the concentration of the alkali in the resulting water layer 10% by weight or less, thus obtaining a water layer containing the organic quaternary ammonium salt and the remaining alkali if any and an oil layer containing the α-alkyl- or α-phenyl-benzylnitrile, and (4) separating the water layer from the oil layer.

2. The method according to claim 1, wherein the extraction is carried out at a temperature of −20° to 150° C.

3. A method for recovering an organic quaternary ammonium salt from a reaction solution produced by a reaction between a benzylnitrile and a halide in the presence of an alkali and the organic quaternary ammonium salt as a catalyst, the reaction solution comprising an α-alkyl- or α-phenyl-benzylnitrile, the alkali and the organic quaternary ammonium salt, which comprises subjecting the reaction solution to extraction with water to obtain a water layer containing the organic quaternary ammonium salt and an oil layer containing the α-alkyl- or α-phenyl-benzylnitrile, separating the water layer from the oil layer, mixing the water layer with an alkali to make a concentration of the alkali in the water layer 5% by weight or higher and then subjecting the resulting water layer to extraction with an organic solvent to obtain an organic layer containing the organic quaternary ammonium salt.

4. The method according to claim 3, wherein the alkali is at least one member selected from the group consisting of sodium hydroxide, potassium hydroxide, lithium hydroxide, sodium carbonate, potassium carbonate, sodium hydrogencarbonate and calcium hydroxide.

5. The method according to claim 3, wherein the organic solvent is at least one member selected from the group consisting of halohydrocarbons, carboxylic acid esters, ketones, nitriles and alcohols, or the benzylnitrile to be used in the reaction or a mixture of the benzylnitrile and the halide to be used in the reaction.

* * * * *